(12) United States Patent
Pastouret et al.

(10) Patent No.: US 11,513,284 B2
(45) Date of Patent: Nov. 29, 2022

(54) REDUCED DIAMETER OPTICAL FIBER AND MANUFACTURING METHOD

(71) Applicant: Draka Comteq France, Paron (FR)

(72) Inventors: Alain Pastouret, Paron (FR); Pierre Sillard, Paron (FR); Louis-Anne de Montmorillon, Paron (FR)

(73) Assignee: Draka Comteq France, Paron (FR)

( * ) Notice: Subject to any disclaimer, the term of this patent is extended or adjusted under 35 U.S.C. 154(b) by 0 days.

(21) Appl. No.: 17/082,355

(22) Filed: Oct. 28, 2020

(65) Prior Publication Data

US 2021/0072458 A1   Mar. 11, 2021

Related U.S. Application Data

(63) Continuation of application No. 16/320,738, filed as application No. PCT/IB2016/001278 on Jul. 29, 2016, now Pat. No. 10,852,473.

(51) Int. Cl.
*G02B 6/02* (2006.01)
*G02B 6/00* (2006.01)
*G02B 6/036* (2006.01)

(52) U.S. Cl.
CPC ..... *G02B 6/02395* (2013.01); *G02B 6/02342* (2013.01); *G02B 6/03694* (2013.01)

(58) Field of Classification Search
CPC .. G02B 6/00; G02B 6/03694; G02B 6/02395; G02B 6/02342

(Continued)

(56) References Cited

U.S. PATENT DOCUMENTS 7,200,310 B2 * 4/2007 Roba ................. G02B 6/02395
385/128
7,203,408 B2 * 4/2007 Matthijsse ........... G02B 6/3855
385/80

(Continued)

FOREIGN PATENT DOCUMENTS

EP   1650175 A1   4/2006
EP   2781941 A1   9/2014

(Continued)

OTHER PUBLICATIONS

International Search Report in counterpart International Application No. PCT/IB2016/001278 dated Apr. 28, 2017, pp. 1-2.

(Continued)

*Primary Examiner* — Kaveh C Kianni
(74) *Attorney, Agent, or Firm* — Additon, Pendleton & Witherspoon, P.A.

(57) ABSTRACT

The invention relates to an optical fiber 1 comprising a core 2 and a cladding 3 surrounding the core 2 and having an outer diameter of 125 μm, the optical fiber 1 comprising a cured primary coating 4 directly surrounding the cladding 3 and a cured secondary coating 5 directly surrounding the cured primary coating 4, said cured primary coating 4 having a thickness $t_1$ between 10 and 18 μm and an in-situ tensile modulus $Emod_1$ between 0.10 and 0.18 MPa, said cured secondary coating 5 having a thickness $t_2$ between 10 microns and 18 microns and an in-situ tensile modulus $Emod_2$ between 700 and 1200 MPa, wherein said first and second thicknesses and said first and second in-situ tensile moduli satisfy the following equation:

$4\% < (t_1 \times t_2 \times E\,mod_1 \times E\,mod_2^3)/(t_{1\_norm} \times t_{2\_norm} \times E\,mod_{1\_norm} \times E\,mod_{2\_norm}^3) < 50\%.$

19 Claims, 6 Drawing Sheets

(58) Field of Classification Search
USPC .......................................................... 385/123
See application file for complete search history.

(56) References Cited

U.S. PATENT DOCUMENTS

| | | | | |
|---|---|---|---|---|
| 7,272,289 | B2* | 9/2007 | Bickham | G02B 6/02395 |
| | | | | 385/100 |
| 7,485,342 | B2 | 2/2009 | Kawamori | |
| 8,145,027 | B2* | 3/2012 | Overton | C03C 25/106 |
| | | | | 385/127 |
| 8,400,968 | B2 | 3/2013 | Liu et al. | |
| 8,426,020 | B2 | 4/2013 | Schmid et al. | |
| 8,426,021 | B2 | 4/2013 | Cattron et al. | |
| 8,503,367 | B2 | 8/2013 | Liu et al. | |
| 8,600,206 | B2* | 12/2013 | Overton | G02B 6/02395 |
| | | | | 385/100 |
| 8,989,545 | B2* | 3/2015 | Nakanishi | G02B 6/02395 |
| | | | | 385/128 |
| 9,057,817 | B2* | 6/2015 | Bookbinder | G02B 6/028 |
| 9,125,235 | B2 | 9/2015 | Liu et al. | |
| 9,128,236 | B2 | 9/2015 | Nakanishi et al. | |
| 9,188,754 | B1* | 11/2015 | Risch | G02B 6/4486 |
| 9,237,597 | B2 | 1/2016 | Liu et al. | |
| 9,244,221 | B1* | 1/2016 | Ocampo | C03C 25/1065 |
| 9,521,581 | B2 | 12/2016 | Liu et al. | |
| 9,995,874 | B2 | 6/2018 | Bookbinder et al. | |
| 10,241,262 | B2* | 3/2019 | Iwaguchi | C03C 25/1065 |
| 10,345,543 | B2* | 7/2019 | Bookbinder | G02B 6/4432 |
| 10,852,473 | B2 | 12/2020 | Pastouret et al. | |
| 2005/0031283 | A1* | 2/2005 | Fabian | C03C 25/1065 |
| | | | | 385/128 |
| 2009/0175583 | A1* | 7/2009 | Overton | C03C 25/106 |
| | | | | 385/100 |
| 2010/0119202 | A1* | 5/2010 | Overton | C03C 25/106 |
| | | | | 385/100 |
| 2010/0290781 | A1* | 11/2010 | Overton | C03C 25/106 |
| | | | | 385/100 |
| 2012/0163759 | A1* | 6/2012 | Hinoshita | G02B 6/02395 |
| | | | | 385/128 |
| 2014/0226941 | A1* | 8/2014 | Tanaka | G02B 6/4482 |
| | | | | 385/100 |
| 2014/0247454 | A1* | 9/2014 | Bhagavatula | A61B 5/0084 |
| | | | | 356/479 |
| 2014/0247455 | A1* | 9/2014 | Bhagavatula | G01B 9/02091 |
| | | | | 356/479 |
| 2014/0308015 | A1* | 10/2014 | Bookbinder | G02B 6/028 |
| | | | | 385/124 |
| 2015/0219845 | A1* | 8/2015 | Bookbinder | G02B 6/02395 |
| | | | | 385/128 |
| 2015/0277031 | A1* | 10/2015 | Bookbinder | G02B 6/02395 |
| | | | | 385/115 |
| 2016/0274300 | A1* | 9/2016 | Li | G02B 6/0288 |
| 2016/0306109 | A1* | 10/2016 | Iwaguchi | C03C 25/40 |
| 2017/0075061 | A1* | 3/2017 | Bookbinder | G02B 6/03644 |
| 2019/0170934 | A1 | 6/2019 | Pastouret et al. | |

FOREIGN PATENT DOCUMENTS

| | | |
|---|---|---|
| WO | 2011/072173 A2 | 6/2011 |
| WO | 2014/172143 A1 | 10/2014 |
| WO | 2015/068803 A1 | 5/2015 |
| WO | 2018/020287 A1 | 2/2018 |

OTHER PUBLICATIONS

International Preliminary Report on Patentability in counterpart International Application No. PCT/IB2016/001278 dated Jan. 29, 2019, pp. 1-6.

Intention to Grant in counterpart European Application No. 16788189.5 dated Feb. 18, 2020, pp. 1-6.

Examination Report in counterpart Indian Application No. 201917003367 dated Aug. 31, 2021, pp. 1-6.

* cited by examiner

REDUCED DIAMETER OPTICAL FIBER AND MANUFACTURING METHOD

1. CROSS-REFERENCE TO PRIORITY APPLICATIONS

This application is a continuation of U.S. patent application Ser. No. 16/320,738 for Reduced Diameter Optical Fiber and Manufacturing Method, filed Jan. 25, 2019, (and published Jun. 6, 2019, as U.S. Publication No. 2019/0170934 A1), which itself is the U.S. national-stage application of International Patent Application No. PCT/IB2016/001278 for Reduced Diameter Optical Fiber and Manufacturing Method, filed Jul. 29, 2016, (and published Feb. 1, 2018, as International Publication No. WO 2018/020287 A1). Each of the foregoing patent applications and patent application publications is hereby incorporated by reference in its entirety.

2. TECHNICAL FIELD

The present invention relates to the field of optical waveguide structure of the optical fiber type.

3. BACKGROUND ART

Optical fibers are used to transmit information over long distances, at the speed of light in glass. Deployment of optical fibers has shown a tremendous increase due to the development of FTTx business (such as Fiber To The Home (FTTH), Fiber To The Curb (FTTC)). In this context, there is an increasing demand in high-density or reduced size cable designs, which reduce cable size for a given number of fibers or put more fibers for a given cable section.

Patent document U.S. Pat. No. 8,600,206 discloses an optical fiber of a small-diameter comprising a core and a cladding, a primary coating surrounding the cladding and a secondary coating surrounding the primary coating. However, the in situ modulus of the primary coating disclosed by this document is too high to allow the micro bending loss level of a 180 µm-diameter fiber being close to one of a standard 245 µm fiber, which is about 1.5 dB/km at 1550 nm.

Patent document WO2014/172143 A1 discloses a small-diameter coated optical fiber in which the primary coating has an in situ modulus of 0.50 MPa or less, and the secondary coating has an in situ modulus of 1500 MPa or greater.

However, due to the excessive level of the secondary coating in situ modulus, compared to the primary modulus and primary secondary thickness, the fiber described by WO2014/172143 A1 has the disadvantage of increasing micro bending losses compared to a standard 245 µm fiber. In addition, the excessive difference between primary and secondary moduli also translates into an excessive gap between the different material thermal expansion coefficients and gives rise to coating delamination and fiber attenuation increasing, especially at low operational temperatures.

Therefore, it would be desirable to provide 180 µm-diameter optical fibers that still feature satisfactory properties compared to standard 245 µm fibers, especially regarding the main coating attributes (strip-ability, adhesion to glass) and the fiber performance in terms of micro bending losses and mechanical reliability under stress.

4. SUMMARY

In one particular embodiment of the invention, an optical fiber is disclosed, which comprises a core and a cladding surrounding the core and having an outer diameter of 125 µm, the optical fiber comprising a cured primary coating directly surrounding the cladding and a cured secondary coating directly surrounding the cured primary coating, said cured primary coating having a thickness $t_1$ between 10 and 18 µm and an in-situ tensile modulus $Emod_1$ between 0.10 and 0.18 MPa, said cured secondary coating having a thickness $t_2$ lower or equal to 18 µm and an in-situ tensile modulus $Emod_2$ between 700 and 1200 MPa, wherein said first and second thicknesses and said first and second in-situ tensile moduli satisfy the following equation:

$$4\% < (t_1 \times t_2 \times E\,mod_1 \times E\,mod_2^3)/(t_{1\_norm} \times t_{2\_norm} \times E\,mod_{1\_norm} \times E\,mod_{2\_norm}^3) < 50\%$$

Where ($t_{1\_norm}$; $t_{2\_norm}$; $Emod_{1\_norm}$; $Emod_{2\_norm}$) are the featuring values of a standard 245 µm-diameter optical fiber and are equal to (33.5 µm; 25 µm; 0.4 MPa; 800 MPa).

In spite of its reduced diameter, a 180 µm-diameter optical fiber according to the invention features satisfactory properties compared to standard 245 µm fibers, especially regarding the main coating attributes (strip-ability, adhesion to glass) and the fiber performance in terms of micro bending losses and mechanical reliability under stress.

In this matter, when such a 180 µm reduced diameter fiber has no specific bend insensitive design, it can feature a micro bending losses below 5 dB/km at 1625 nm (sandpaper test: Method B of the IEC-62221 document).

This technical advantage is obtained while using a standard 125 µm outer diameter glass cladding. Indeed, this cladding diameter is common to all major fiber categories in industry, which makes the fiber easy to implement in operations.

Since the glass cladding diameter is already set, the invention mainly relies on a non-obvious selection of the interplaying parameters featuring the dual-layer coating. The selection of these parameters has a significant impact on the fiber attributes, due not only to their individual variations but also to the particular combination of the different parameters variations.

To be specific, the selection of primary thickness $t_1$ higher than 18 µm is positive on the point of view of the micro bending performances, but it is to the detriment of mean fiber stripping force and fiber mechanical reliability. Indeed, in the case of a 180 µm diameter fiber, it translates into a secondary coating having a thickness $t_2$ lower than 10 µm, which is not sufficient to ensure good mechanical protection to the fiber, notably with a primary coating having a very low tensile modulus.

In contrast, the selection of primary thickness $t_1$ lower than 10 µm firstly makes micro bending losses increasing outside the range of what is expected, that could not be corrected by playing on other parameters (primary and secondary moduli). Secondly, it has an impact on the fiber stripping ability, as it is then very difficult to avoid having primary pieces of coating left on the bare fiber, even after cleaning. So does the selection of secondary thickness $t_2$ higher than 18 µm, considering the induced limitation of the primary coating thickness $t_1$.

The selection of a primary modulus $Emod_1$ (also called "Young's modulus" or "elastic modulus") lower than 0.10 MPa is also positive on the point of view of the micro bending performances but on the other hand, it impacts negatively the pull out force level that measures the adhesion of the primary coating to the cladding glass surface, which can translate into delamination issues upon ageing. In contrast, the selection of a primary modulus $Emod_1$ higher than 0.18 MPa increases the micro bending losses of the fiber.

The selection of a secondary modulus $Emod_2$ lower than 700 MPa could not compensate the very low primary modulus $Emod_1$ in order to get sufficient fiber strength with a secondary thickness inferior to 18 μm. When the secondary modulus $Emod_2$ is higher than 1200 MPa, micro bending loss modeling shows that it is not possible to keep the fiber micro bending loss level of an 180 μm design close to one of a current 245 μm product.

In addition, and it is a clear insight of the importance of combining properly the different parameters one with each other, a ratio $(t_1 \times t_2 \times Emod_1 \times Emod_2^3)/(t_{1\_norm} \times t_{2\_norm} \times Emod_{1\_norm} \times Emod_{2\_norm}^3)$ lower than 4% or higher than 50% translates into an excessive difference between the primary and secondary moduli and therefore into an excessive difference between the respective material thermal expansion coefficients (TEC) of the primary and secondary coatings. As a consequence, it gives rise to potential coating delamination issues while making the fiber micro bending losses increasing, especially at very low operating temperatures.

Thus, it is essential to proceed to the selection of the different parameters not only in regard of their proper impacts on the fiber attributes but also in regard of the impact of their interplays on the fiber attributes, and especially on the micro bending losses.

In one particular embodiment, both the core and the cladding are made of doped or un-doped silica.

In one particular embodiment, the cured primary coating has a cure rate yield after UV curing above between 80 and 90% one week after draw, preferably between 82 and 87%.

This ratio is calculated using Fourier Transform Infrared spectroscopy (FTIR) technique on cured coating piece directed removed from fiber. It measures the quantity of residual UV reactive acrylate functions present in the coating compared to the initial quantity present in the resin state. The FTIR procedure is described below.

In one particular embodiment, the cured secondary coating has a cure rate yield after UV curing above between 94 and 98% one week after draw, preferably between 95 and 97%.

The cure rate yield for the secondary coating is characterized by essentially the same procedure as for the primary coating and is described below.

The previous coating curing can be obtained by ways know in the art for subjecting optical fibers to UV radiation by e.g. microwave powered UV lamps, or UV-LED technologies.

In one particular embodiment, the primary coating has a thickness $t_1$ between 10 and 16 μm.

Such a selection of the primary thickness $t_1$ range allows increasing the secondary thickness $t_2$, and therefore improving the mechanical behavior of the optical fiber.

In one particular embodiment, the secondary coating has a tensile modulus $Emod_2$ higher than 1000 MPa.

Such a selection of the secondary tensile modulus $Emod_2$ allows improving the mechanical behavior of the optical fiber.

In one particular embodiment, the optical fiber 1 features a bend insensitive design.

Bend insensitive designs helps lowering the micro bending losses of the fiber.

In one particular embodiment, the cladding 3 comprises a depressed area, which is preferentially a trench.

In one particular embodiment, the optical fiber has a core 2 with a positive refractive index difference with the quartz outer cladding. The core is surrounded by a cladding 3, wherein part of the cladding comprises a trench with a negative refractive index difference with the outer cladding.

Preferably the reduced diameter fiber is compatible with a standard single mode fiber such that:

The reduced diameter optical fiber presents a cable cut-off value inferior or equal to 1260 nm.

The reduced diameter optical fiber presents Mode Field Diameter (MFD) value between 8.6 and 9.5 μm at 1310 nm.

The reduced diameter optical fiber presents a zero-dispersion wavelength between 1300 and 1324 nm.

Preferably, the fiber complies with the macro-bend losses specified in the ITU-T G.657.A1 (October 2012) recommendations.

More preferably, the fiber complies with the macro-bend losses specified in the ITU-T G.657.A2 (October 2012) recommendations.

The invention also pertains an optical cable comprising at least one of said optical fibers.

The invention also pertains a method for manufacturing an optical fiber from a core and a cladding surrounding the core and having an outer diameter of 125 μm, the method comprising:

Applying a primary coating directly on the cladding, with a thickness $t_1$ between 10 and 18 μm, Curing the primary coating to obtain a cured primary coating with an in-situ tensile modulus $Emod_1$ between 0.10 and 0.18 MPa, Applying a secondary coating directly on the cured primary coating, with a thickness $t_2$ lower or equal to 18 μm, Curing the secondary coating to obtain a cured secondary coating with an in-situ tensile modulus $Emod_2$ between 700 and 1200 MPa, The preceding steps being performed so that said first and second thicknesses and said first and second in-situ tensile moduli satisfy the following equation:

$$4\% < (t_1 \times t_2 \times E\,mod_1 \times E\,mod_2^3)/(t_{1\_norm} \times t_{2\_norm} \times E\,mod_{1\_norm} \times E\,mod_{2\_norm}^3) < 50\%$$

Where $(t_{1\_norm}; t_{2\_norm}; Emod_{1\_norm}; Emod_{2\_norm})$ are the featuring values of a standard 245 μm-diameter optical fiber and are equal to (33.5 μm; 25 μm; 0.4 MPa; 800 MPa).

While not explicitly described, the present embodiments may be employed in any combination or sub-combination.

5. BRIEF DESCRIPTION OF THE DRAWINGS

The invention can be better understood with reference to the following description and drawings, given by way of example and not limiting the scope of protection, and in which.

6. DESCRIPTION OF AN EMBODIMENT

The present invention relates to optical fibers and targets reaching micro bending losses and other fiber performances similar to what is obtained with 245 μm fibers, but with a reduced fiber size up to 180 μm, thanks to a specific combination of primary and secondary coating monomer-polymer ratios, thicknesses and tensile moduli.

Many specific details of the invention are set forth in the following description and in FIGS. 1 to 5. One skilled in the art, however, will understand that the present invention may have additional embodiments, or that the present invention may be practiced without several of the details described in the following description.

6.1 Particular Embodiment of the Reduced Diameter Optical Fiber

Figure 1:
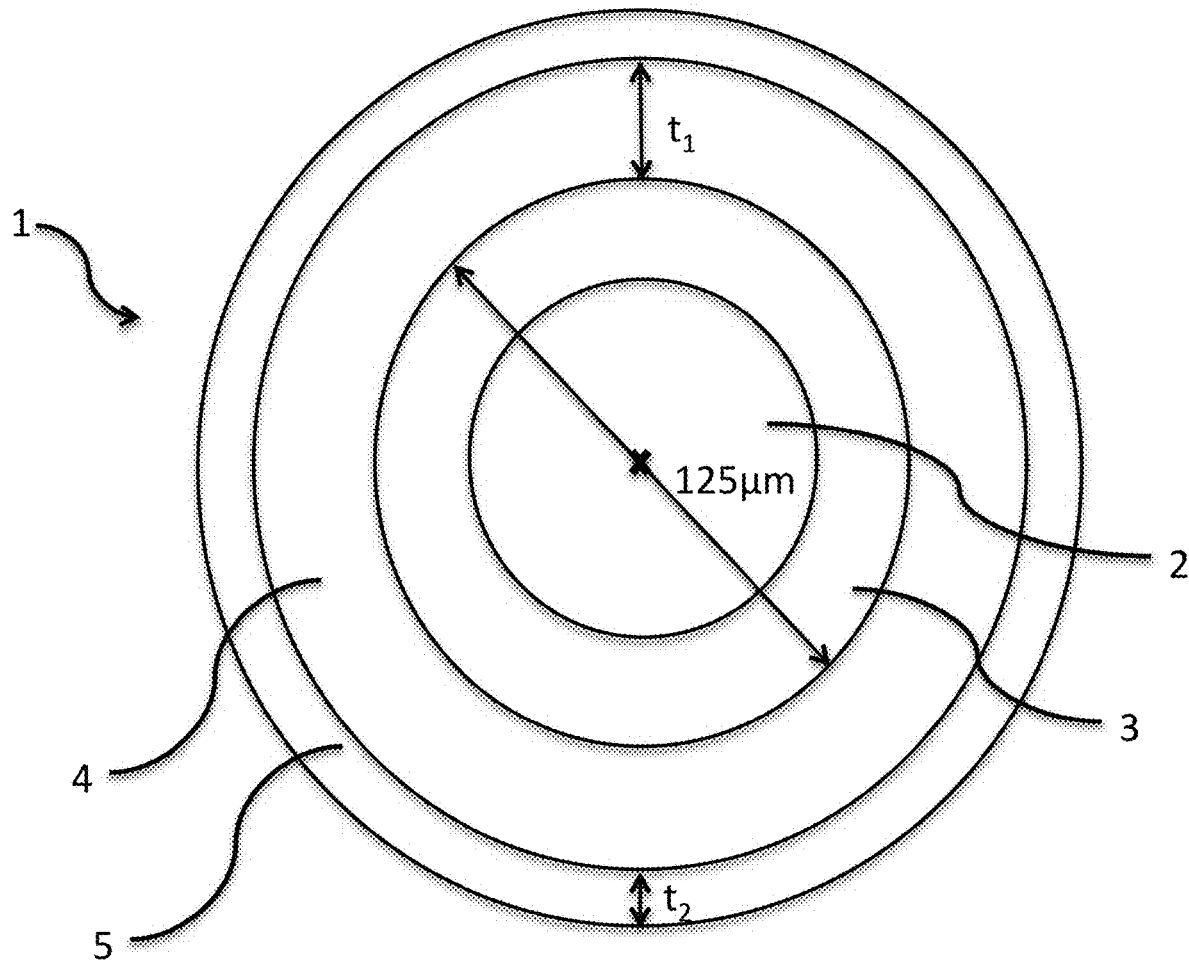
FIG. 1 is a schematic view of the cross section of an optical fiber according to an embodiment of the invention.

FIG. 1 illustrates schematically an optical fiber 1 according to one embodiment, which is defined about an axis of revolution X that is orthogonal to the plan of FIG. 1. The fiber 1 comprises a core 2 and a cladding 3 surrounding the core 2, both made of un-doped or doped silica. The cladding 3 has an outer diameter of about 125 μm. A cured primary coating 4 having a cure rate yield between 80 and 90%, preferably between 82 and 87%, is directly surrounding the cladding 3, with a thickness $t_1$ between 10 and 18 μm and an in-situ tensile modulus $Emod_1$ between 0.10 and 0.18 MPa. A cured secondary coating 5 having a cure rate yield between 94 and 98%, preferably between 95 and 97%, directly surrounds the cured primary coating 4, with a thickness $t_2$ lower or equal to 18 μm and an in-situ tensile modulus $Emod_2$ between 700 and 1200 MPa, with a ratio $(t_1 \times t_2 \times Emod_1 \times Emod_2^3)/(t_{1\_norm} \times t_{2\_norm} \times Emod_{1\_norm} \times Emod_{2\_norm}^3)$ between 4 and 50%.

Where $(t_{1\_norm}; t_{2\_norm}; Emod_{1\_norm}; Emod_{2\_norm})$ are the featuring values of a standard 245 μm-diameter optical fiber and are equal to (33.5 μm; 25 μm; 0.4 MPa; 800 MPa).

If those characteristics are not verified, the reduced diameter fiber cannot present acceptable attenuation losses under stress (notably micro bending losses would be higher than those of a standard 245 μm-diameter fibers and attenuation variation at 1550 nm could not be kept within 0.05 bB/km under thermo cycling between −60° C. and +85° C.).

Figure 2:
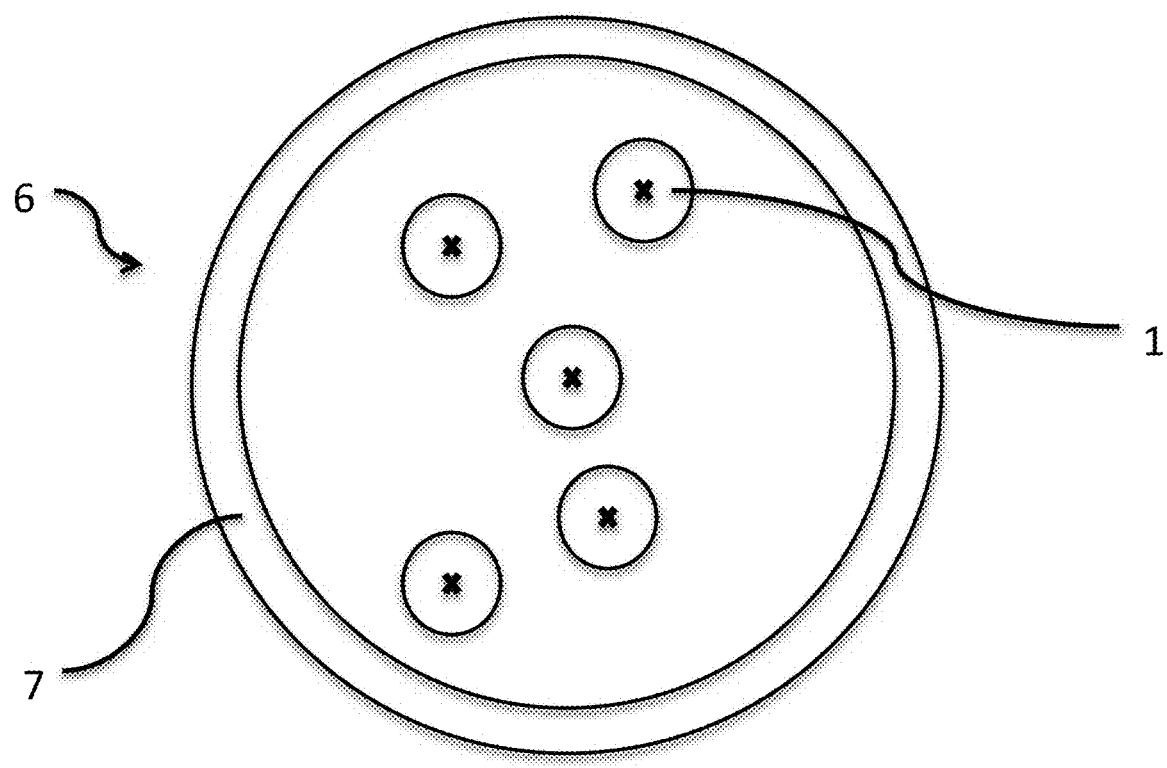
FIG. 2 is a schematic view of the cross section of an optical cable according to an embodiment of the invention.

In one embodiment, a plurality of these optical fibers 1 is regrouped within the sheath 7 that defines the outline of an optical cable 6, as illustrated by FIG. 2.

6.2 Method for Manufacturing a Reduced Diameter Optical Fiber

The core and cladding of the present optical fibers may be produced by a variety of chemical vapor deposition methods that are well known in the art for producing a core rod, such as Outside Vapor Deposition (OVD), Axial Vapor Deposition (VAD), Modified Chemical Vapor Deposition (MCVD), or Plasma enhanced Chemical Vapor Deposition (PCVD, PECVD). In one embodiment, the core rods produced with the above described processes may be provided with an additional layer of silica on the outside using prefabricated tubes, such as in Rod-in-Tube or Rod-in-Cylinder processes, or by outside deposition processes such as Outside Vapor Deposition (OVD) or Advanced Plasma Vapor Deposition (APVD). The preforms thus obtained are drawn into optical fiber in a fiber draw tower in which the preform is heated to a temperature sufficient to soften the glass, e.g. a temperature of about 2000° C. or higher. The preform is heated by feeding it through a furnace and drawing a glass fiber from the molten material at the bottom of the furnace. In subsequent stages the fiber while being drawn is cooled down to a temperature below 100° C. and provided with the reduced diameter coating.

The coating is provided on the outer surface of the glass part of the optical fiber, by passing the fiber through a coating applicator. In the applicator liquid unreacted coating is fed to the fiber and the fiber with coating is guided through a sizing die of appropriate dimensions. Some processes use applicators in which both coatings, primary and secondary are applied the fiber (so called wet-on-wet). The fiber with two layers of coating subsequently passes through a curing system for curing both coatings. Other processes use a first applicator for applying the primary coating on the fiber which is subsequently cured. After (partial) curing of the primary coating the secondary coating is applied in a second applicator, after which a second curing occurs. The UV source can be provided notably from microwave powered lamps or LED lamps.

After curing of the coatings the fiber is guided over a capstan, which pulls the molten fiber out of the drawing furnace. After the capstan the fiber is guided to a take up spool.

6.3 Tests Procedures to be Performed on Optical Fibers to Determine the Primary and Secondary In-Situ Tensile Modulus $Emod_1$ and $Emod_2$ The primary modulus $Emod_1$ can be either directly measured on fiber or with the help of a Dynamic Mechanical Analyzer (DMA) using film or bulk coating sample.

In contrast, it is not possible to measure the secondary modulus $Emod_2$ directly on the fiber 1.

6.3.1 Primary In Situ Modulus $Emod_1$ Test Procedure on Fiber

A. Sample Choice

Representative fiber samples are chosen two weeks after drawing, coming from the middle part of a preform.

B. Sample Preparation

Figure 3A:
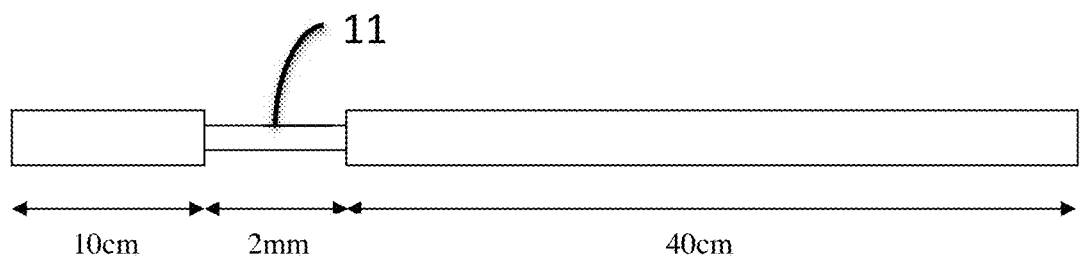
FIGS. 3a, 3b, 3c and 3d are four illustrations of different steps of a sample preparation when performing a primary In situ modulus $Emod_1$ test on fiber.

Three fiber samples are cut of about 50 to 60 cm each. 2 mm of coating is then stripped at a distance of about 10 cm from the end, as illustrated by FIG. 3a.

Each sample of fiber is then glued in glass slides.

Figure 3B:
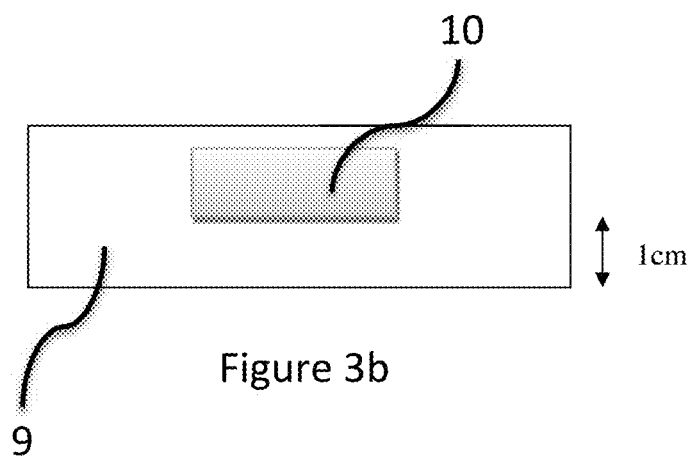

In this matter, a glass slide 9 is placed on an Aluminum support 20, which has been prepared to fit this glass slide. A landmark at 1 cm from the bottom limit of the glass is then made before fixing an adhesive tape 10 at this landmark, as illustrated by FIG. 3b.

Figure 3C:
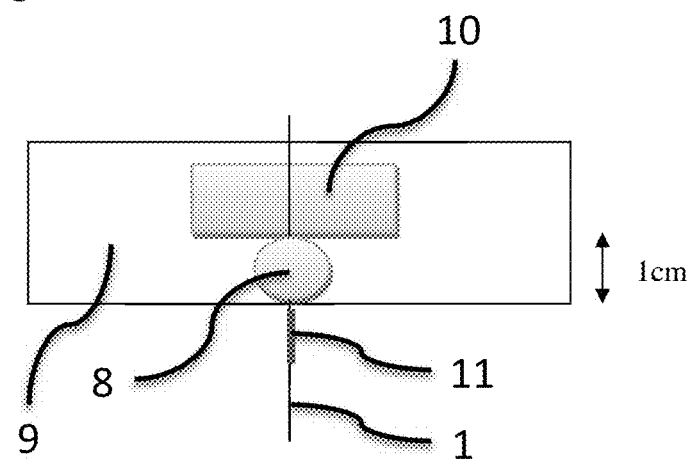
Figure 3D:
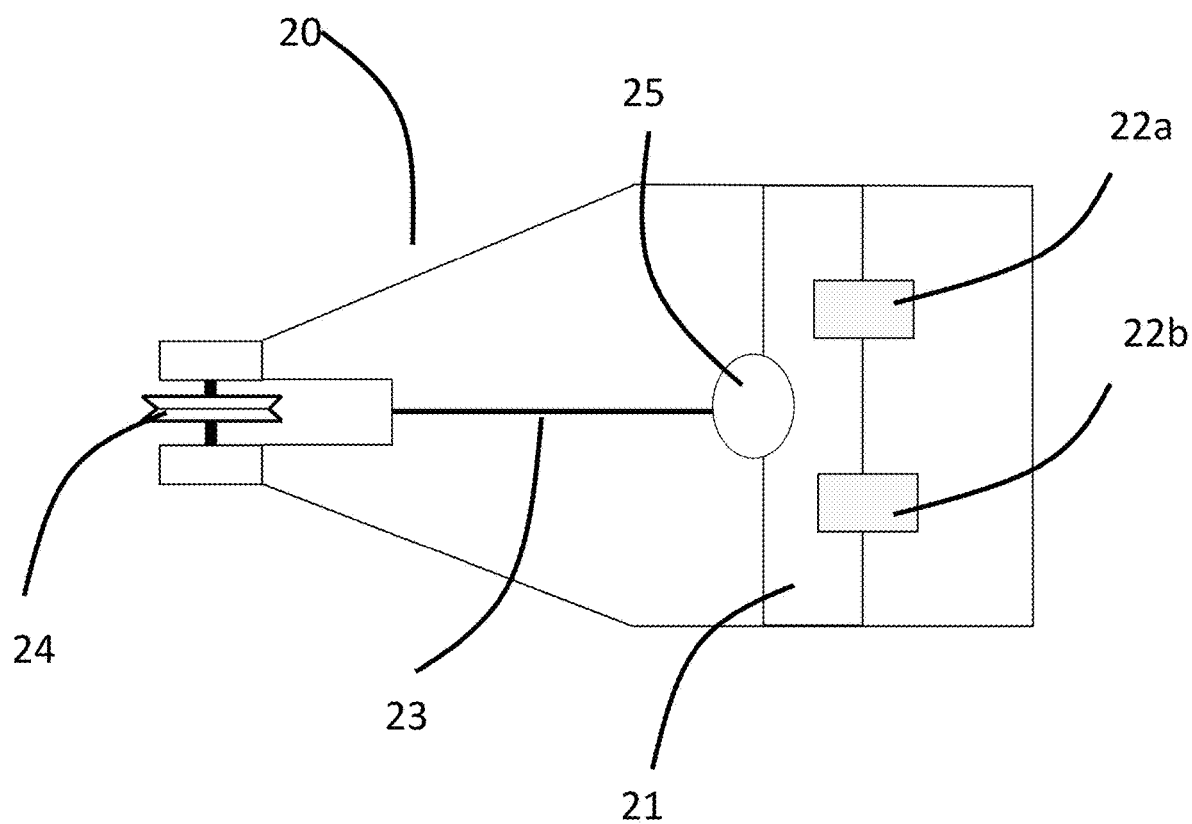
Figure 4A:
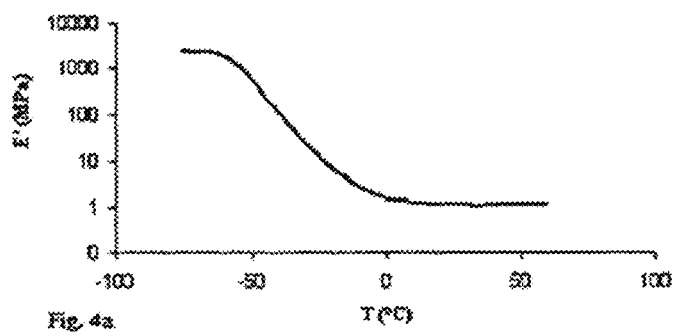
FIGS. 4a, 4b are two curves obtained after performing DMA.
Figure 4B:
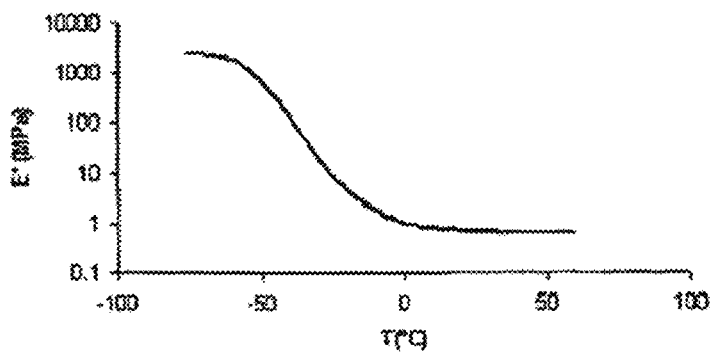
Figure 5:
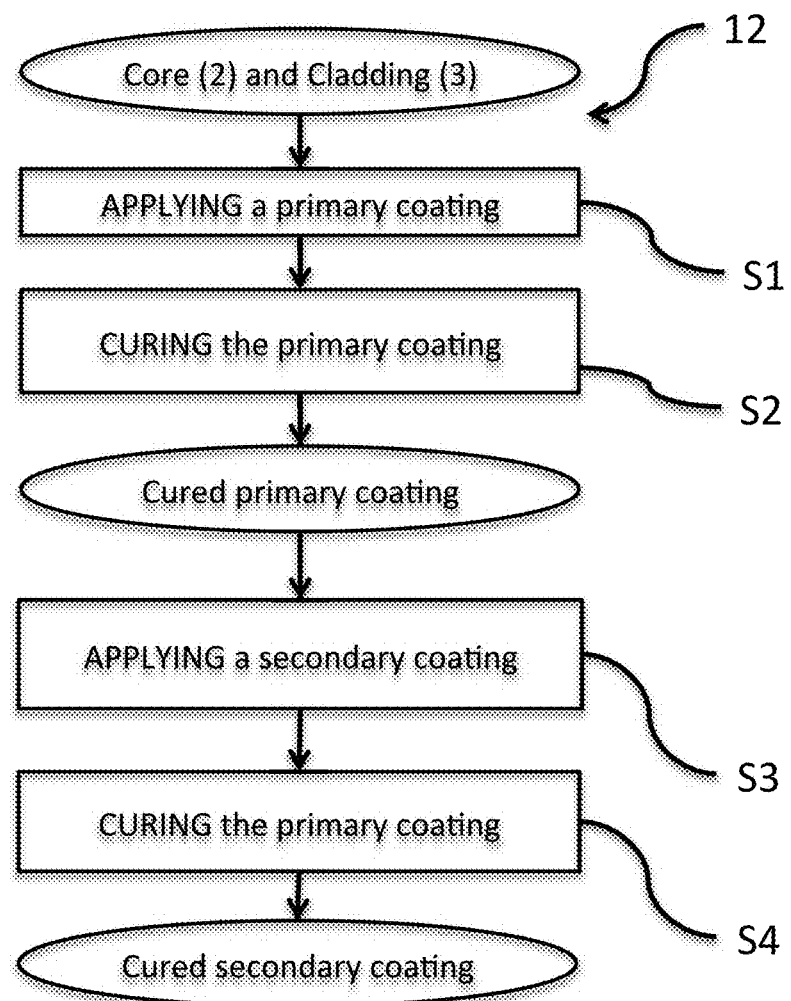
FIG. 5 is a flowchart illustrating steps according to one embodiment of the invention.

The fiber sample 1 is then positioned on the glass slide so that the 2 mm stripped position 11 is laying just out the glass slide. The fiber is subsequently glued to the glass slide, preferably with a two component Epoxy resin. A 1 cm-diameter resin dot 8 is used to fix the fiber to the glass slide, as illustrated by FIG. 3c C. In-Situ Modulus Emod Test When the glue is hardened, the fiber is cut on top of the glass slide and the prepared sample is placed on an aluminum support plate 20, as illustrated by FIG. 3d. and placed under a video microscope. The support plate 20 has a groove 23 for guiding the fiber and a small pulley 24 to allow the fiber to move during the test. The glass slide is fixed in a slot 21 by hold dawn clamps 22a, 22b. The 2 mm stripped fiber 11 is above the inspection slot 25.

A curve of displacement versus weight is obtained by measuring the displacement of the fiber in the stripped 2 mm zone under influence of several (typically four) different weights. Care is taken that for each displacement measurement the fiber stops moving after 4 to 5 seconds and that after releasing all weights from the fiber, the fiber returns to its original position.

This measurement is repeated for each fiber sample.

A suitable apparatus for performing such measurement is a microscope with top and bottom illumination, equipped with a color video camera connected to a video color monitor and a displacement measurement system.

The diameter of resin dot 8 is measured with a caliper. The cross sectional dimensions of the fiber are measured on a geometrical bench in order to check the exact value of the primary coating diameter and the bare fiber 11 diameter.

D. Results

Following the displacements measurements, the shear modulus and the tensile modulus is calculated. Firstly the shear modulus is calculated, in dynes/cm². The usual formula is:

$$G_{eq} = \left(\frac{980.7}{m}\right)\frac{\ln(2R_2/2R_1)}{2\pi L}$$

With:
 $G_{eq}$: shear modulus (dynes/cm²)
 m: slope of the linear function of displacement vs. weight (cm/g)
 R1: diameter of the bare fiber (μm)
 R2: diameter of the primary coating (μm)
 L: length of the isolated section of coated fiber on the glass slide (cm), under the resin dot.

The shear modulus in units of dynes/cm² can be converted to tensile modulus $E_{eq}$ in MPa by using the usual formula below.

$$E_{eq} = 2G_{eq}(1+v) \times 10^{-7}$$

$E_{eq}$: tensile modulus (MPa)
 $G_{eq}$: shear modulus (dynes/cm²)
 v: Poisson's ratio In this relation, the Poisson's ratio (☐) is approximated to 0.5, considering the primary coating material type is an ideal rubber within the extension experienced during the measurement.

6.3.2 Secondary In Situ Modulus $Emod_2$ Test Procedure on Film

The secondary in situ modulus $Emod_2$ is measured using fiber tube-off samples.

To obtain a fiber tube-off sample, a 0.14 mm Miller stripper is first clamped down approximately 2.5 cm from the end of the coated fiber. The 2.5 cm region of fiber extending from the stripper is plunged into a stream of liquid nitrogen and held for 3 seconds. The fiber is then removed from the stream of liquid nitrogen and quickly stripped. The stripped end of the fiber is inspected to insure that the coating is removed. If coating remains on the glass, the sample is prepared again. The result is a hollow tube of primary and secondary coatings. The diameters of the glass, primary coating and secondary coating are measured from the end-face of the unstripped fiber. To measure secondary in situ modulus, fiber tube-off samples can be run with an instrument such as a Rheometries DMT A IV instrument at a sample gauge length 11 mm. The width, thickness, and length of the sample are determined and provided as input to the operating software of the instrument. The sample is mounted and run using a time sweep program at ambient temperature (21° C.) using the following parameters:

Frequency: 1 Rad/sec
Strain: 0.3%
Total Time=120 sec.
Time Per Measurement=1 sec
Initial Static Force=15.0 [g]
Static>Dynamic Force by=10.0 [%]

Once completed, the last five E' (storage modulus) data points are averaged. Each sample is run three times (fresh sample for each run) for a total of fifteen data points. The averaged value of the three runs is reported as the secondary in situ modulus.

6.4 Test Procedure to Measure Coating Cure Yield by FTIR

A—As Per the Primary Coating Cure Yield:
 a) Measure of Acrylate Area Ratio in the Resin State
 A background spectrum is firstly realized on the FTIR apparatus.

Then a droplet of primary resin is positioned on the top of the FTIR cell. The FTIR spectrum is then realized. The FTIR subtracts the background spectrum to obtain the primary FTIR spectrum.

On the spectrum, the area of the residual acrylate peak is measured between 813 and 798 cm$^{-1}$.

The area of a reference peak is then measured between 1567 and 1488 cm$^{-1}$.

The resin acrylate ratio in then obtained by dividing the acrylate peak area by the reference peak area.

b) Measure of Acrylate Area Ratio in the Coating State
 A background spectrum is firstly realized on the FTIR apparatus.

Then a 5 mm piece of coating is removed from the coated fiber one week after draw using a razor blade and the convex side is positioned on the top of the FTIR cell. The FTIR spectrum is then realized. The FTIR subtracts the background spectrum to obtain the primary FTIR spectrum.

On the spectrum, the area of the residual acrylate peak is measured between 813 and 798 cm$^{-1}$.

The area of a reference peak is then measured between 1567 and 1488 cm$^{-1}$.

The coating acrylate ratio in then obtained by dividing the acrylate peak area by the reference peak area.

c) Measure of the Primary Coating Cure Yield
 The primary coating cure yield is obtained according to the formula below:

Primary cure (in %)=(1−coating acrylate ratio/resin acrylate ratio)*100

B—As Per the Secondary Coating Cure Yield:
 a) Measure of Acrylate Area Ratio in the Resin State
 The same procedure is applied as for the primary resin to obtain the secondary resin ratio.
 b) Measure of Acrylate Area Ratio in the Coating State
 A background spectrum is firstly realized on the FTIR apparatus.

Then a 30 cm-coated fiber is cut one week after draw into 2 to 3 cm-lengths that are assembled to form a bundle, which is positioned on the top of the FTIR cell. The FTIR spectrum is then realized. The FTIR subtracts the background spectrum to obtain the primary FTIR spectrum.

On the spectrum the area of the residual acrylate peak is measured between 813 and 798 cm$^{-1}$.

The area of a reference peak is then measured between 1567 and 1488 cm$^{-1}$.

The coating ratio in then obtained by dividing the acrylate peak area by the reference peak area.

c) Measure of the Secondary Coating Cure Yield

The secondary coating cure yield is obtained according to the formula below:

Secondary cure (in %)=(1−coating acrylate ratio/
resin acrylate ratio)*100

6.5 Tests Performed to Determine the Thermal Stability of the Optical Fibers

Tests have been performed in order to challenge the thermal stability of an optical fiber according to the invention. In this matter, 1 km of such a fiber in a free coil has been operated under temperatures ranging between −60° C. to +70° C. As a result, the change in attenuation of a light signal with a wavelength of 1550 nm and 1625 nm have been measured under 0.05 dB/km for a fiber of the known G657A2-type (BendBright$^{XS}$© FTTH optical fiber, produced by Prysmian Group). Such a minimization of the light attenuation in an optical fiber is undoubtedly a major performance that distinguishes the invention from the prior art.

The invention claimed is:

1. An optical fiber (1) having an optical-fiber diameter between 165 microns and 197 microns, the optical fiber comprising a core (2) and a cladding (3) surrounding the core (2) and having an outer diameter of 125 microns, the optical fiber (1) comprising a cured primary coating (4) directly surrounding the cladding (3) and a cured secondary coating (5) directly surrounding the cured primary coating (4), said cured primary coating (4) having a thickness $t_1$ between 10 microns and 18 microns and an in-situ tensile modulus $Emod_1$ between 0.10 MPa and 0.18 MPa, said cured secondary coating (5) having a thickness $t_2$ between 10 microns and 18 microns and an in-situ tensile modulus $Emod_2$ between 700 MPa and 1200 MPa, wherein said first and second thicknesses and said first and second in-situ tensile moduli satisfy the following equation:

$$4\% < (t_1 \times t_2 \times E\,mod_1 \times E\,mod_2^3)/(t_{1\_norm} \times t_{2\_norm} \times E\,mod_{1\_norm} \times E\,mod_{2\_norm}^3) < 50\%$$

Where $t_{1\_norm}$ is the thickness of the cured primary coating of a standard 245 μm-diameter optical fiber, which is equal to 33.5 microns, $t_{2\_norm}$ is the thickness of the cured secondary coating of a standard 245 μm-diameter optical fiber, which is equal to 25 microns, $Emod_{1\_norm}$ is the in-situ tensile modulus of the cured primary coating of a standard 245 μm-diameter optical fiber, which is equal to 0.4 MPa, and $Emod_{2\_norm}$ is the in-situ tensile modulus of the cured secondary coating of a standard 245 μm-diameter optical fiber, which is equal to 800 MPa.

2. The optical fiber (1) according to claim 1, wherein both the core (2) and the cladding (3) are made of doped or un-doped silica.

3. The optical fiber (1) according to claim 1, wherein the cured primary coating (4) has a cure rate yield after UV curing between 80 and 90 percent one week after draw.

4. The optical fiber (1) according to claim 1, wherein the cured secondary coating (5) has a cure rate yield after UV curing between 94 and 98 percent.

5. The optical fiber (1) according to claim 1, wherein the primary coating (4) has a thickness $t_1$ between 10 microns and 16 microns.

6. The optical fiber (1) according to claim 1, wherein the secondary coating (5) has a tensile modulus $Emod_2$ higher than 1000 MPa.

7. The optical fiber (1) according to claim 1, wherein the optical fiber (1) complies with the macro-bend losses specified in the ITU-T G.657.A1 (October 2012) recommendations.

8. The optical fiber (1) according to claim 7, wherein the cladding (3) comprises a depressed area.

9. The optical fiber (1) according to claim 1, wherein, at a wavelength of 1550 nanometers and at a wavelength of 1625 nanometers, one kilometer of the optical fiber (1) in a free coil has temperature-induced attenuation losses of less than 0.05 dB/km as measured over a temperature range between −60° C. and +70° C.

10. An optical cable (6) comprising at least one optical fiber (1) according to claim 1.

11. An optical fiber (1) having an optical-fiber diameter between 165 microns and 197 microns, the optical fiber comprising a core (2) and a cladding (3) surrounding the core (2) and having an outer diameter of 125 microns, the optical fiber (1) comprising a cured primary coating (4) directly surrounding the cladding (3) and a cured secondary coating (5) directly surrounding the cured primary coating (4), said cured primary coating (4) having a thickness $t_1$ between 10 microns and 18 microns, an in-situ tensile modulus $Emod_1$ between 0.10 MPa and 0.18 MPa, and a cure rate yield after UV curing between 80 and 90 percent one week after draw, said cured secondary coating (5) having a thickness $t_2$ between 10 microns and 18 microns, an in-situ tensile modulus $Emod_2$ between 700 MPa and 1200 MPa, and a cure rate yield after UV curing between 94 and 98 percent, wherein said first and second thicknesses and said first and second in-situ tensile moduli satisfy the following equation:

$$4\% < (t_1 \times t_2 \times E\,mod_1 \times E\,mod_2^3)/(t_{1\_norm} \times t_{2\_norm} \times E\,mod_{1\_norm} \times E\,mod_{2\_norm}^3) < 50\%$$

where $t_{1\_norm}$ is the thickness of the cured primary coating of a standard 245 μm-diameter optical fiber, which is equal to 33.5 microns, $t_{2\_norm}$ is the thickness of the cured secondary coating of a standard 245 μm-diameter optical fiber, which is equal to 25 microns, $Emod_{1\_norm}$ is the in-situ tensile modulus of the cured primary coating of a standard 245 μm-diameter optical fiber, which is equal to 0.4 MPa, and $Emod_{2\_norm}$ is the in-situ tensile modulus of the cured secondary coating of a standard 245 μm-diameter optical fiber, which is equal to 800 MPa.

12. The optical fiber (1) according to claim 11, wherein the primary coating (4) has a thickness $t_1$ between 10 microns and 16 microns.

13. The optical fiber (1) according to claim 11, wherein the secondary coating (5) has a tensile modulus $Emod_2$ higher than 1000 MPa.

14. The optical fiber (1) according to claim 11, wherein the cladding (3) comprises a trench.

15. The optical fiber (1) according to claim 11, wherein the optical fiber has a cable cut-off wavelength less than or equal to 1260 nanometers.

16. The optical fiber (1) according to claim 11, wherein, at a wavelength 1310 nanometers, the optical fiber has a Mode Field Diameter (MFD) between 8.6 and 9.5 microns.

17. The optical fiber (1) according to claim 11, wherein the optical fiber has a zero-dispersion wavelength between 1300 and 1324 nanometers.

18. The optical fiber (1) according to claim 11, wherein, at a wavelength of 1550 nanometers and at a wavelength of 1625 nanometers, one kilometer of the optical fiber (1) in a free coil has temperature-induced attenuation losses of less than 0.05 dB/km as measured over a temperature range between −60° C. and +70° C.

19. An optical cable (6) comprising at least one optical fiber (1) according to claim 11.

* * * * *